(12) United States Patent
Grbovic et al.

(10) Patent No.: US 11,011,990 B2
(45) Date of Patent: May 18, 2021

(54) POWER CONVERTER

(71) Applicant: HUAWEI TECHNOLOGIES CO., LTD., Guangdong (CN)

(72) Inventors: Petar Grbovic, Munich (DE); Roland Huempfner, Munich (DE); Jose Antonio Cobos, Madrid (ES); Pedro Alou, Madrid (ES); Jesus Angel Oliver, Madrid (ES); Miroslav Vasic, Madrid (ES)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/935,812

(22) Filed: Jul. 22, 2020

(65) Prior Publication Data

US 2020/0350820 A1 Nov. 5, 2020

Related U.S. Application Data

(63) Continuation of application No. PCT/EP2018/051547, filed on Jan. 23, 2018.

(51) Int. Cl.
*H02M 3/158* (2006.01)
*H02M 7/483* (2007.01)
*H02M 1/00* (2006.01)

(52) U.S. Cl.
CPC ......... *H02M 3/158* (2013.01); *H02M 3/1584* (2013.01); *H02M 7/483* (2013.01); *H02M 2001/0058* (2013.01); *H02M 2001/0067* (2013.01)

(58) Field of Classification Search
CPC .... H02M 3/158; H02M 3/1584; H02M 7/483; H02M 2001/0058; H02M 2001/0067
See application file for complete search history.

(56) References Cited

U.S. PATENT DOCUMENTS

| | | | |
|---|---|---|---|
| 2005/0134236 A1 | 6/2005 | Renken | |
| 2012/0217943 A1 | 8/2012 | Haddad | |
| 2013/0076135 A1 | 3/2013 | Zhu et al. | |
| 2014/0334196 A1* | 11/2014 | Chen | H02M 3/1584 363/21.04 |
| 2015/0022179 A1 | 1/2015 | Krauter | |
| 2015/0155712 A1 | 6/2015 | Mondal | |

(Continued)

FOREIGN PATENT DOCUMENTS

| | | |
|---|---|---|
| CN | 102362550 A | 2/2012 |
| CN | 104025438 A | 9/2014 |

*Primary Examiner* — Jue Zhang
(74) *Attorney, Agent, or Firm* — Womble Bond Dickinson (US) LLP (57) ABSTRACT

A DC/DC power converter has an input terminal, an output terminal, and a ground terminal. The DC/DC power converter includes two capacitors connected in series between the output terminal and the ground terminal, a boost converter having a first boost converter terminal connected to the input terminal, a second boost converter terminal connected to the output terminal, and a third boost converter terminal connected to a connection point between the capacitors, and a step-up converter having a first step-up converter terminal connected to the ground terminal, a second step-up converter terminal connected to the output terminal, and a third step-up converter terminal connected to the connection point.

19 Claims, 3 Drawing Sheets

(56) References Cited

U.S. PATENT DOCUMENTS

2017/0201177 A1    7/2017  Kesarwani et al.
2017/0250607 A1    8/2017  Zhak et al.
2017/0373593 A1*  12/2017  Mueller ................ H02M 3/155

* cited by examiner

PRIOR ART

Fig.3

PRIOR ART

Fig.4

POWER CONVERTER

CROSS-REFERENCE TO RELATED APPLICATIONS

This application is a continuation of International Application No. PCT/EP2018/051547, filed on Jan. 23, 2018, the disclosure of which is hereby incorporated by reference in its entirety.

FIELD OF THE INVENTION

The present invention relates to a power converter, especially to a power converter used in a renewable energy device such as a photo-voltaic device or a wind energy device.

BACKGROUND

Solar systems are systems used to convert the sun's radiation energy into electric energy. In some applications the electric energy is directly used by a local load, while in some applications the produced electric energy is pumped back to an electric grid. A solar conversion system is composed of a photovoltaic panel that produces a DC voltage/current from solar energy and a power converter that converts the generated DC voltage/current into an AC voltage/current which is suited to drive the local load or to be pumped back to the electric grid.

Among the most important requirements of solar conversion systems are harvesting and efficiency. Harvesting in this context means to extract as much power as possible from the photovoltaic panel under the given circumstances. Efficiency is the ratio between the power supplied to the load or grid and the power extracted from the photovoltaic panel. Currently, the best product on market has an efficiency of <98.8%.

Figure 4:
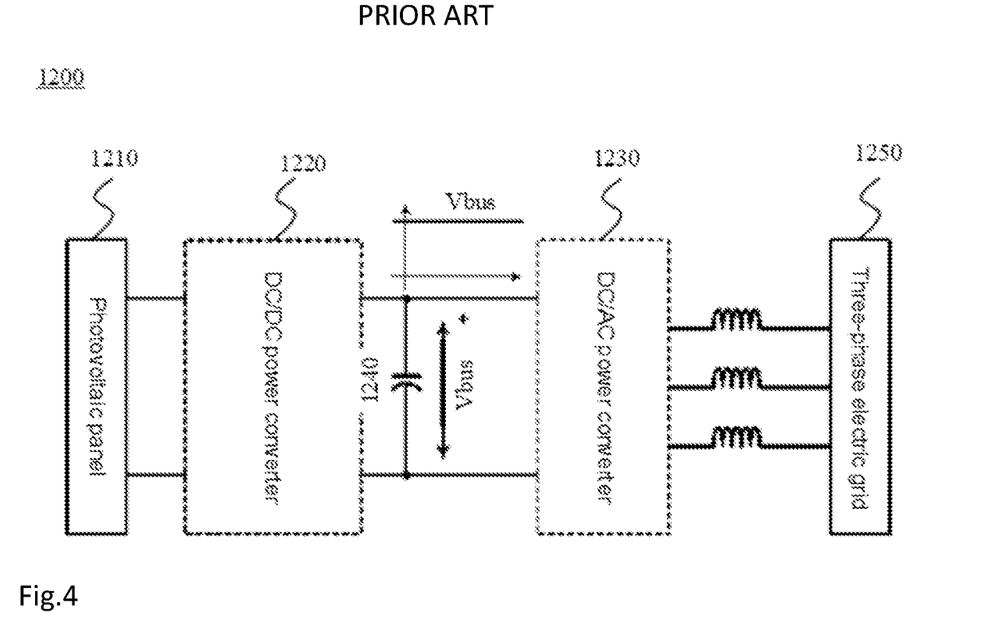
FIG. 4 is a schematic block diagram of a conventional DC/AC power converter with double conversion.

A common approach for such a power conversion is a single conversion. This means that a DC voltage or current produced by a photovoltaic panel is converted to an AC voltage or current in a single step. FIG. 4 shows a schematic block diagram of such a conventional DC/AC power converter with single conversion.

In the conventional DC/AC power converter 1100, a photovoltaic panel 1110 is connected to an input of a three-phase DC/AC power converter 1130. A three phase PWM inverter may, for example, be used as the DC/AC power converter 1130. A bus capacitor 1140 is connected in parallel to the input of the DC/AC power converter 1130. The output of the DC/AC power converter 1130 is connected to a three-phase electric grid 1150.

The DC/AC power converter 1130 converts a DC voltage supplied by the photovoltaic panel 1110 into a three-phase AC voltage that is fed to the electric grid 1150. However, the DC voltage supplied by the photovoltaic panel 1110 varies over time, and so does the DC bus voltage Vbus at the input of the DC/AC power converter 1150.

Among the main drawbacks of this approach are:
The photovoltaic panel cannot be operated in an optimum way which results in a low harvesting of the entire system.
If an interconnection transformer is used, the output voltage is reduced, yielding 270 V up to 330 V phase to phase.
It is not possible to reduce the output voltage in the case of grid connected transformer-less applications.
High conduction losses are caused.

To avoid those drawbacks, a double conversion is generally used. This means that in a first step, a DC voltage or current produced by a photovoltaic panel is converted into another DC voltage or current which then is converted into an AC voltage or current in a second step. FIG. 5 shows a schematic block diagram of such a conventional DC/AC power converter with double conversion and constant intermediate dc link voltage.

In the conventional DC/AC power converter 1200, a photovoltaic panel 1210 is connected to an input of a DC/DC power converter 1220. A boost DC/DC converter may, for example, be used as the DC/DC power converter 1120. An output of the DC/DC power converter 1120 is connected to an input of a three-phase DC/AC power converter 1230. A three phase PWM inverter may, for example, be used as the DC/AC power converter 1230. A bus capacitor 1240 is connected in parallel to the input of the DC/AC power converter 1230. The output of the DC/AC power converter 1230 is connected to a three-phase electric grid 1250.

The DC/DC power converter 1120 converts a DC voltage supplied by the photovoltaic panel 1210 into another DC voltage. In the present example, even if the DC voltage supplied by the photovoltaic panel 1210 varies over time, the DC bus voltage Vbus at the output of the DC/DC power converter 1120, and thus at the input of the DC/AC power converter 1250, is constant. This constant DC bus voltage Vbus is then converted by the DC/AC power converter 1230 into a three-phase AC voltage that is fed to the electric grid 1250.

Among the main drawbacks of this approach are:
Large input inductors are required.
The input boost converter has high switching and conduction losses.
High voltage switches are required.
Electromagnetic compatibility issues may arise.

Double conversions may also be realized using different concepts. For example, full envelope tracking of the dc bus voltage may be used. The DC bus voltage in this case is not constant, but has the form of a rectified envelope of a sinusoidal voltage. Therefore no switching losses occur on the output bridge switches, but high conduction losses on the output H bridge. However, this concept cannot be applied to a three-phase solar system with a common input. Another drawback is the large input boost inductor required and high losses on the input boost converter.

Another concept is a convertor with partial envelope tracking of the bus voltage. Also in this case, the DC bus voltage is not constant, but follows the output voltage envelope. Thus, switching losses are reduced and a smaller output inductor is required. However, a large input boost inductor is required, which results in high losses on the input boost converter.

All those approaches have drawbacks which affect the efficiency and harvesting of the power converters.

SUMMARY

It is therefore an object of the present invention to provide a power converter having an increased efficiency and harvesting.

The foregoing and other objects are achieved by the features of the independent claims. Further embodiments are apparent from the dependent claims, the descriptions and the figures.

According to a first aspect, a DC/DC power converter is provided. The DC/DC power converter has an input terminal, an output terminal, and a ground terminal. The DC/DC power converter comprises two capacitors connected in series between the output terminal and the ground terminal, a boost converter having a first boost converter terminal connected to the input terminal, a second boost converter terminal connected to the output terminal, and a third boost converter terminal connected to a connection point between the capacitors, and a step-up converter having a first step-up converter terminal connected to the ground terminal, a second step-up converter terminal connected to the output terminal, and a third step-up converter terminal connected to the connection point.

In common language, boost converter and step-up converter may be used simply to refer to a converter that externally delivers at its output a voltage which is higher than a voltage than applied to its input. In a more specific sense, however, as it is used in the present application, the terms refer to the way in which the converters internally operate. The term boost converter is used for a converter that is able to generate, at a single load capacitor, an output voltage higher than the input voltage by switching a signal path of an input current supplied via an input inductor. The term step-up converter is used for a converter that is able to generate, from an input voltage applied to capacitor, a higher voltage at a series connection of this capacitor with another capacitor by balancing the voltages at the capacitors according to an inverse ratio of their capacitances.

With such a DC/DC power converter it is possible, for example, to convert a variable DC voltage at the input into a variable DC voltage at the output, wherein the voltage range of the output voltage is smaller than the voltage range of the input voltage. Thereby it is possible, for example, to improve the operating conditions of a subsequent DC/AC converter which may result in a larger range of the input voltage for the total power conversion, in an improved overall efficiency of the power conversion as well as in an improved harvesting of energy from a variable voltage source such as a photo-voltaic device or a wind energy device.

In one embodiment, the step-up converter is a resonant converter comprising a resonant network for equilibrating the voltage on the capacitors.

Thereby it is possible, for example, to step-up the voltage applied to the capacitor connected to ground according to an inverse ratio of the capacitance values of the two capacitors, thus achieving a defined output voltage.

In one embodiment, the resonant converter comprises a resonance capacitor connected between a first and a second internal node, a resonance inductor connected between a third internal node and the third step-up converter terminal, a first switch connected between the first step-up converter terminal and the first internal node, a second switch connected between the first internal node and the third internal node, a third switch connected between the third internal node and the second internal node, and a fourth switch connected between the second internal node and the second step-up converter terminal.

Thereby it is possible, for example, to efficiently realize the resonant converter.

In one embodiment, the DC/DC power converter is configured to operate the resonant converter by alternately toggling between a first state in which the first and third internal switches are closed and the second and fourth internal switches are opened, and a second state in which the first and third internal switches are opened and the second and fourth internal switches are closed.

Thereby it is possible, for example, to efficiently generate a voltage by the resonant converter which is higher than its input voltage.

In one embodiment, the DC/DC power converter is further configured to operate the resonant converters in a way that the first to fourth switches are switched with a duty cycle of approximately 50%.

Thereby it is possible, for example, to achieve an efficient operation of the resonant converter.

In one embodiment, the DC/DC power converter is configured to operate the boost converter depending on an input voltage applied between the input terminal and the ground terminal.

Thereby it is possible, for example, to adapt the operation of the boost converter to the input voltage in order to achieve a desired output voltage.

In one embodiment, the boost converter comprises a single phase including a boost inductor connected between the first boost converter terminal and a fourth internal node, a fifth switch connected between the fourth internal node and the second boost converter terminal, and a sixth switch connected between the fourth internal node and the third boost converter terminal.

Thereby it is possible, for example, to change the voltage to be processed by the resonant converter, thus achieving a reduced variation of the output voltage compared to the input voltage.

In one embodiment, the DC/DC power converter is configured to open the fifth switch and close the sixth switch if the input voltage is lower than a first predetermined value, to close the fifth switch and open the sixth switch if the input voltage is higher than a second predetermined value which is greater than the first predetermined value, and to alternately toggle between a third state in which the fifth switch is opened and the sixth switch is closed, and a fourth state in which the fifth switch is closed and the sixth switch is opened, if the input voltage is in a range between the first predetermined value and the second predetermined value, wherein the duty cycle is selected depending on the input voltage.

Thereby it is possible, for example, to achieve a piecewise linear dependency between the output voltage and the input voltage, wherein for a low input voltage, the output voltage may be proportional to the input voltage, for a medium input voltage, the output voltage may be constant, and for a high input voltage, the output voltage may be equal to the input voltage.

In one embodiment, the DC/DC power converter is configured to operate the boost converter in a way that the boost inductor operates in a boundary mode between a continuous conduction mode and a discontinuous conduction mode.

Thereby it is possible, for example, to achieve zero voltage switching transitions for the switches included therein, thus reducing switching losses.

In one embodiment, the boost converter comprises two or more phases, each phase including a boost inductor connected between the first boost converter terminal and a fourth internal node, a fifth switch connected between the fourth internal node and the second boost converter terminal, and a sixth switch connected between the fourth internal node and the third boost converter terminal.

Thereby it is possible, for example, to process more power via the boost converters.

In one embodiment, one of the phases operates as a master phase and the remaining phases operate as slave phases which are phase synchronized with the master phase by a phase-locked loop.

Thereby it is possible, for example, to achieve an efficient cooperation between the boost converters connected in parallel.

In one embodiment, the first to fourth switches and/or the fifth and sixth switches are formed as semiconductor switches.

Thereby it is possible, for example, to realize the switches without needing mechanical parts. Especially if MOSFETs are used, they are easy to be controlled, for example by a gate driver.

In one embodiment, the first to fourth switches and/or the fifth and sixth switches are controlled via independent gate drivers.

Thereby it is possible, for example, to realize a precise control of the switches, especially if they are realized as MOSFETs.

In one embodiment, the two capacitors have the same capacitance value so that the step-up converter operates as a voltage doubler.

Thereby it is possible, for example, to achieve a symmetric operation of the step-up converter.

The above object is also achieved in accordance with a second aspect.

According to the second aspect, a method of operating a DC/DC power converter is provided. The method comprises applying an input voltage between an input terminal and a ground terminal of the DC/DC power converter and converting the input voltage via a boost converter connected to the input terminal, an output terminal of the DC/DC power converter, and a connection point between two capacitors that are connected in series between the output terminal and the ground terminal, and via a step-up converter connected to the output terminal, the ground terminal, and the connection point.

With such a method it is possible, for example, to convert a variable DC voltage at the input into a variable DC voltage at the output, wherein the voltage range of the output voltage is smaller than the voltage range of the input voltage. Thereby it is possible, for example, to improve the operating conditions of a subsequent DC/AC converter which may result in a larger range of the input voltage for the total power conversion, in an improved overall efficiency of the power conversion as well as in an improved harvesting of energy from a variable voltage source such as a photovoltaic device or a wind energy device.

In one embodiment, the step-up converter is a resonant converter comprising a resonant network for equilibrating the voltage on the capacitors.

Thereby it is possible, for example, to step-up the voltage applied to the capacitor connected to ground according to an inverse ratio of the capacitance values of the two capacitors, thus achieving a defined output voltage.

In one embodiment, the resonant converter comprises a resonance capacitor connected between a first and a second internal node, a resonance inductor connected between a third internal node and the third step-up converter terminal, a first switch connected between the first step-up converter terminal and the first internal node, a second switch connected between the first internal node and the third internal node, a third switch connected between the third internal node and the second internal node, and a fourth switch connected between the second internal node and the second step-up converter terminal.

Thereby it is possible, for example, to efficiently realize the resonant converter.

In one embodiment, the method further comprises operating the resonant converter by alternately toggling between a first state in which the first and third internal switches are closed and the second and fourth internal switches are opened, and a second state in which the first and third internal switches are opened and the second and fourth internal switches are closed.

Thereby it is possible, for example, to efficiently generate a voltage by the resonant converter which is higher than its input voltage.

In one embodiment, the method further comprises operating the resonant converters in a way that the first to fourth switches are switched with a duty cycle of approximately 50%.

Thereby it is possible, for example, to achieve an efficient operation of the resonant converter.

In one embodiment, the method further comprises operating the boost converter depending on an input voltage applied between the input terminal and the ground terminal.

Thereby it is possible, for example, to adapt the operation of the boost converter to the input voltage in order to achieve a desired output voltage.

In one embodiment, the boost converter comprises a single phase including a boost inductor connected between the first boost converter terminal and a fourth internal node, a fifth switch connected between the fourth internal node and the second boost converter terminal, and a sixth switch connected between the fourth internal node and the third boost converter terminal.

Thereby it is possible, for example, to change the voltage to be processed by the resonant converter, thus achieving a reduced variation of the output voltage com-pared to the input voltage.

In one embodiment, the method further comprises opening the fifth switch and closing the sixth switch if the input voltage is lower than a first predetermined value, closing the fifth switch and opening the sixth switch if the input voltage is higher than a second predetermined value which is greater than the first predetermined value, and alternately toggling between a third state in which the fifth switch is opened and the sixth switch is closed, and a fourth state in which the fifth switch is closed and the sixth switch is opened, if the input voltage is in a range between the first predetermined value and the second predetermined value, wherein the duty cycle is selected depending on the input voltage.

Thereby it is possible, for example, to achieve a piecewise linear dependency between the output voltage and the input voltage, wherein for a low input voltage, the output voltage may be proportional to the input voltage, for a medium input voltage, the output voltage may be constant, and for a high input voltage, the out-put voltage may be equal to the input voltage.

In one embodiment, the method further comprises operating the boost converter in a way that the boost inductor operates in a boundary mode between a continuous conduction mode and a discontinuous conduction mode.

Thereby it is possible, for example, to achieve zero voltage switching transitions for the switches included therein, thus reducing switching losses.

In one embodiment, the boost converter comprises two or more phases, each phase including a boost inductor connected between the first boost converter terminal and a fourth internal node, a fifth switch connected between the fourth internal node and the second boost converter terminal, and a sixth switch connected between the fourth internal node and the third boost converter terminal.

Thereby it is possible, for example, to process more power via the boost converters.

In one embodiment, the method further comprises operating one of the phases as a master phase and operating the remaining phases as slave phases which are phase synchronized with the master phase by a phase-locked loop.

Thereby it is possible, for example, to achieve an efficient cooperation between the boost converters connected in parallel.

In one embodiment, the first to fourth switches and/or the fifth and sixth switches are formed as semiconductor switches.

Thereby it is possible, for example, to realize the switches without needing mechanical parts. Especially if MOSFETs are used, they are easy to be controlled, for example by a gate driver.

In one embodiment, the method further comprises controlling the first to fourth switches and/or the fifth and sixth switches via independent gate drivers.

Thereby it is possible, for example, to realize a precise control of the switches, especially if they are realized as MOSFETs.

In one embodiment, the two capacitors have the same capacitance value so that the step-up converter operates as a voltage doubler.

Thereby it is possible, for example, to achieve a symmetric operation of the step-up converter.

The above object is also achieved in accordance with a third aspect.

According to the third aspect, a double stage DC/AC power converter is provided. The double stage DC/AC power converter comprises a DC/DC power converter according to some embodiments, and a DC/AC power converter connected to the output terminal of the DC/DC power converter.

With such a AC/DC power converter it is possible, for example, to convert a variable DC voltage at the input into an variable DC voltage at the output of the DC/DC power converter, wherein the voltage range of the output voltage is smaller than the voltage range of the input voltage, and then to convert the variable DC voltage having the smaller voltage range into an AC voltage that may be consumed in a load or that may be fed to a power grid. Thereby it is possible, for example, to improve the operating conditions of the DC/AC converter which may result in a larger range of the input voltage for the total power conversion, in an improved overall efficiency of the power conversion as well as in an improved harvesting of energy from a variable voltage source such as a photo-voltaic device or a wind energy device.

In one embodiment, the DC/AC power converter is a single-phase or multiple-phase DC/AC power converter, and/or a DC voltage source having a variable output voltage is connected to an input terminal of the DC/DC power device.

Thereby it is possible, for example, to convert a variable input DC voltage into an output AC voltage adapted to the type of load or grid.

In one embodiment, the DC voltage source having a variable output voltage is a device for electricity generation from renewable resources, preferably a photo-voltaic device or a wind energy device.

Thereby it is possible, for example, to apply the double stage DC/AC power converter to applications for electricity generation from renewable resources which due to the variable nature of the primary energy used deliver a varying output voltage.

The above object is also achieved in accordance with a fourth aspect.

According to the fourth aspect, a method of operating a AC/DC power converter is provided. The method comprises converting a DC input voltage into a DC output voltage using a method according to the second aspect as such or any of the embodiments of the second aspect, and converting the DC output voltage into an AC output voltage using a DC/AC power converter.

With such method it is possible, for example, to convert a variable DC voltage at the input into a variable DC voltage at the output of the DC/DC power converter, wherein the voltage range of the output voltage is smaller than the voltage range of the input voltage, and then to convert the variable DC voltage having the smaller voltage range into an AC voltage that may be consumed in a load or that may be fed to a power grid. Thereby it is possible, for example, to improve the operating conditions of the DC/AC converter which may result in a larger range of the input voltage for the total power conversion, in an improved overall efficiency of the power conversion as well as in an improved harvesting of energy from a variable voltage source such as a photo-voltaic device or a wind energy device.

In one embodiment, the DC/AC power converter is a single-phase or multiple-phase DC/AC power converter, and/or a DC voltage source having a variable output voltage is connected to an input terminal of the DC/DC power device.

Thereby it is possible, for example, to convert a variable input DC voltage into an output AC voltage adapted to the type of load or grid.

In one embodiment, the DC voltage source having a variable output voltage is a device for electricity generation from renewable resources, preferably a photo-voltaic device or a wind energy device.

Thereby it is possible, for example, to apply the double stage DC/AC power converter to applications for electricity generation from renewable resources which due to the variable nature of the primary energy used deliver a varying output voltage.

DETAILED DESCRIPTION

In the following, an embodiment is described with reference to the enclosed figures.

Figure 1:
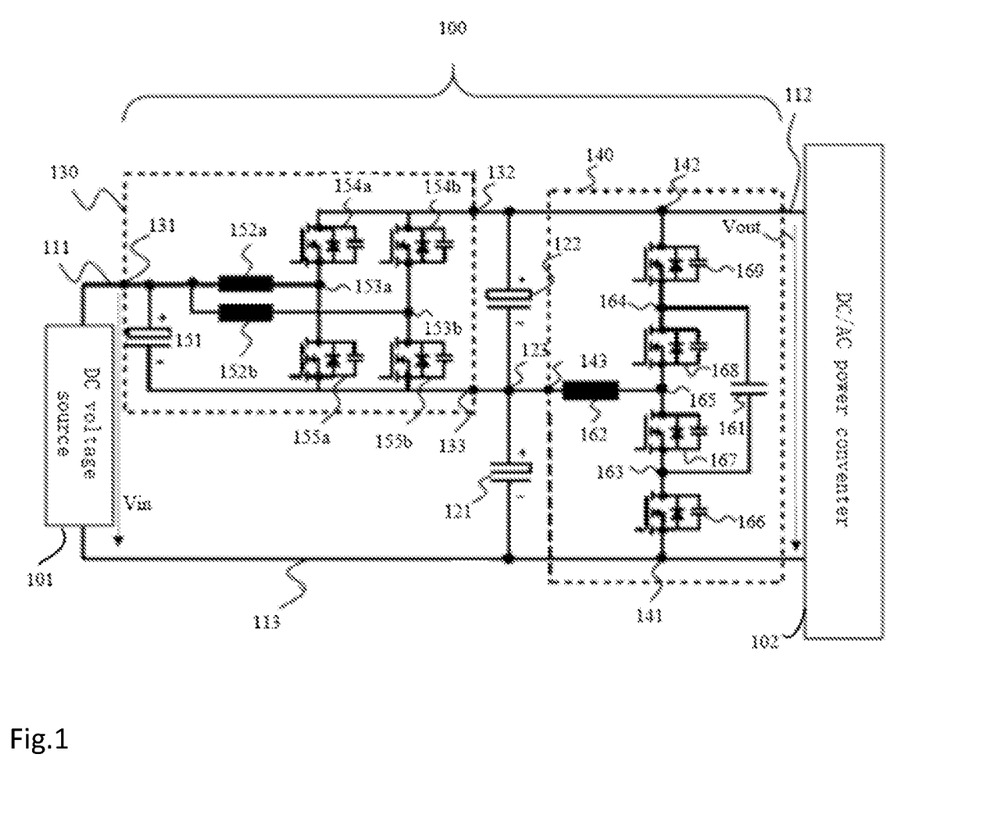
FIG. 1 is a schematic circuit diagram of a DC/AC power converter according to an embodiment of the present invention.

FIG. 1 is a schematic circuit diagram of a DC/AC power converter according to an embodiment.

A DC voltage source 101 having a variable output voltage is connected to an input of a DC/DC power converter 100, i.e. between an input terminal 111 and a ground terminal 113 of the DC/DC power converter 100. The DC voltage source 101 having a variable output voltage may for example be, but is not restricted to, a device for electricity generation from renewable resources such as a photo-voltaic device or a wind energy device.

An output of the DC/DC power converter 100, i.e. an output terminal 112 and the ground terminal 113 of the DC/DC power converter 100, is connected to an input of a DC/AC power converter 102. A single-phase or multiple-phase PWM inverter may, for example, be used as the DC/AC power converter 102. Not shown in the figure, an output of the DC/AC power converter 102 may be connected to a local load or to an electric grid.

The DC/DC power converter 100 comprises two capacitors 121, 122 connected in series between the output terminal 112 and the ground terminal 113 via a connection point 123.

The DC/DC power converter 100 further comprises a boost converter 130 having a first terminal 131 connected to the input terminal 111, a second terminal 132 connected to the output terminal 112, and a third terminal 133 connected to the connection point 123 between the capacitors 121, 122.

As indicated above in the introductory portion, the term boost converter is used for a converter that is able to generate, at a single load capacitor, an output voltage higher than the input voltage by switching a signal path of an input current supplied via an input inductor. The load capacitor in the present case is formed by capacitor 122.

The DC/DC power converter 100 further comprises a resonant converter 140 having a first terminal 141 which is connected to ground 113, a second terminal 142 which is connected to the output terminal 112, and third terminal 143, which is connected to the connection point 123.

The DC/DC power converter 100 thus is a hybrid converter comprising two different types of converters.

The boost converter 130 comprises, at its input, an input capacitor 151. In the specific example shown in FIG. 1, the boost converter 130 comprises two phases. Each of the phases comprises a boost inductor 152a, 152b connected between the first terminal 131 and an internal node 153a, 153b, a switch 154a, 154b connected between the internal node 153a, 153b and the second terminal 132, and a switch 155a, 155b connected between the internal node 153a, 153b and the third terminal 133.

The boost converter, however, is not restricted to the two phases shown in this specific example. It may comprise only a single phase, or more than two phases.

The resonant converter 140 comprises a resonance capacitor 161 connected between an internal node 163 and an internal node 164, a resonance inductor 162 connected between an internal node 165 and the third terminal 143, a first switch 166 connected between the first terminal 141 and the internal node 163, a switch 167 connected between the internal node 163 and the internal node 165, a switch 168 connected between the internal node 165 and the internal node 164, and a switch 169 connected between the internal node 164 and the second terminal 142.

The switches 154a, 154b, 155a, 155b, 166, 167, 168, 169 may, for example, be formed as semiconductor-based switches, preferably as MOSFETs such as low voltage Si MOSFETs, which are for example controlled via separate gate drivers. In the FIG. 1, the switches are represented each as a MOSFET having a free-wheeling diode connected in anti-parallel. Parasitic capacitances are represented in the figure by a capacitor connected in parallel to the MOSFET and the diode.

During operation, the DC/DC power converter 100 converts a DC input voltage Vin supplied by the DC voltage source 101 into a DC output voltage Vout. The DC/AC power converter 102 then converts the DC output voltage Vout into a single-phase or multiple-phase AC voltage that may be fed to a local load or an electric grid (not shown in the figure).

For understanding the operation of the DC/DC power converter 100, an operation of the resonant converter 140 is described first. It is assumed that the switches 155a, 155b are permanently closed and that the switches 154a, 154b are permanently opened. In this case, the input terminal 111 is connected to the connection point 123, and the input voltage Vin is loaded into the capacitor 121. The resonance capacitor 161 and the resonance inductor 162 form a resonant network for equilibrating the voltage at the capacitors 121, 122. Especially, if the capacitors 121, 122 have the same capacitances, the converter 140 operates as a voltage doubler.

For operating the resonant converter 140, the switches comprised therein are alternatingly switched on and off. In a first state, the switches 166, 168 are closed and the switches 167, 169 are opened. In a second state, the switches 166, 168 are opened and the switches 167, 169 are closed. Toggling between these two states is performed with a switching frequency that preferably is approximately equal to the resonant frequency of the resonant network 161, 162. Further, the switches preferably are operated with a duty cycle of approximately 50%.

In the first state, the resonance capacitor 161 and the resonance inductor 162 are connected in series to each other by switch 168 to form a series resonant circuit. This series resonant circuit is connected between the first terminal 141 and the third terminal 143, i.e. in parallel to the capacitor 121. In this state, energy is transferred from the capacitor 121 into the resonant network 161, 162. In the second state, the resonance capacitor 161 and the resonance inductor 162 are connected in series to each other by switch 167 to form a series resonant circuit. This series resonant circuit is connected between the second terminal 142 and the third terminal 143, i.e. in parallel to a capacitor 122. In this state, energy is transferred from the resonant network 161, 162 into the series connection capacitor 122. The inductor 162 should be designed to guarantee a zero voltage switching (ZVS) transition of the switches.

In a known resonant converter, the resonance capacitor and the resonance inductor are permanently connected in series to each other between the two internal nodes 163. However, as described above, also in the present modification the resonance capacitor 161 and the resonance inductor 162 are connected in series to each other both in the first state and in the second state, resulting in a similar operation. The only difference is that in the known resonant converter, the current waveform through the resonant inductor is a sine wave, while in the present modification, it is a rectified sine wave.

Depending on the parasitic capacitances of the employed switches that must be charged and discharged to obtain zero voltage switching transitions, the position of the inductor might be of the great importance, especially at a light load. Connecting the resonance inductor 162 between the internal node 165 and the third terminal 143 may lead to better efficiencies, especially when using CoolMOS technology. Further, in the case of a resonance inductor connected directly in series to the resonance capacitor, the switching frequency might become significantly higher than the resonant frequency at light loads and high parasitic capacitances which would lead to high switching losses.

In a steady state in which the building-up transients have faded out, the voltages across the capacitor 121 and across the capacitor 122 are equilibrated via the resonant network according to an inverse ratio of the corresponding capacitance values. The resonant converter 140 thus operates as a step-up converter, converting a voltage applied between its first and third terminals 141, 143, into a higher voltage between the first and second terminals 141, 142. In the special case in which the capacitance of the capacitor 121 is the same as the capacitance of the capacitor 122, the resonant converter 140 operates as a voltage doubler.

The resonant converter 140 may be operated in two operation modes. In a constant resonance mode, toggling between the two states is constantly performed so that the resonant converter 140 is continuously operated. This mode is preferred when a high output current or power is demanded. In a cycle skip mode, all the switches 166, 167, 168, 169 are switched off for some time after one or several resonant cycles so that the resonant converter is inactive. This is useful when the required output power is low. Operating in this mode may decrease switching losses because the number of switching cycles is lower than in the first mode at expense of higher conduction losses due to higher peaks of resonant current. In both modes, the voltage gain of the resonant converter is unchanged.

The boost converter 130 is operated depending on an input voltage Vin applied between the input terminal 111 and the ground terminal 113. The input voltage range is divided into three sections, and the boost converter 130 has three operation modes, each corresponding to one of these sections.

If the input voltage Vin is lower than a first threshold value V1, the switches 154a, 154b are opened and the 155a, 155b are closed. In this case the input voltage Vin is permanently applied to the connection point 123, and the output voltage Vout is determined by the resonant converter 140. In the specific example of a voltage doubler as described above, the output voltage Vout is twice the input voltage Vin.

If the input voltage Vin is higher than a second threshold value V2 which is greater than the first predetermined value, the switches 154a, 154b are closed and the 155a, 155b are opened. In this case the input voltage Vin is permanently applied to the output terminal 112, and the output voltage Vout is equal to the input voltage Vin.

If the input voltage Vin is in a range V1 and V2, the boost converter 130 is alternately toggled between a state in which the switches 154a, 154b are opened and the switches 155a, 155b are closed, and a state in which the switches 154a, 154b are closed and the switches 155a, 155b are opened. The duty cycle of this toggling is selected depending on the input voltage.

The duty cycled of the boost converter 130 is a ratio between a time in which the switches 154a, 154b are closed and the switches 155a, 155b are opened and a duration of an entire switching cycle. In this sense, d=0 for an input voltage Vin below V1, and d=1 (or 100%) for an input voltage Vin above V2.

In the range between V1 and V2, the boost converter 130 is active and its duty cycle is adjusted so that a constant output voltage is achieved. In this case, the relation between the input voltage Vin, the output voltage Vout and the duty cycle d is given by:

$$V\text{out}/V\text{in}=2/(1+d).$$

Figure 2:
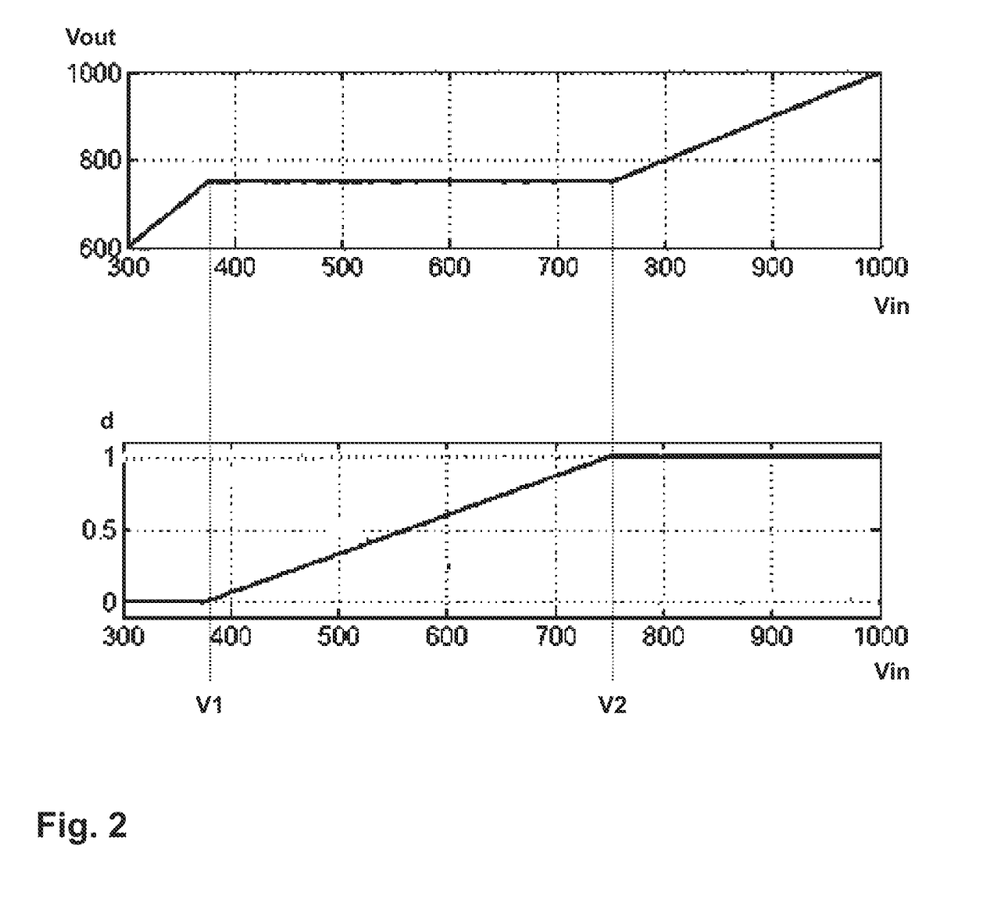
FIG. 2 is a diagram showing an output voltage and a duty cycle as a function of an input voltage of a DC/DC power converter included in the DC/AC power converter shown in FIG. 1.
Figure 3:
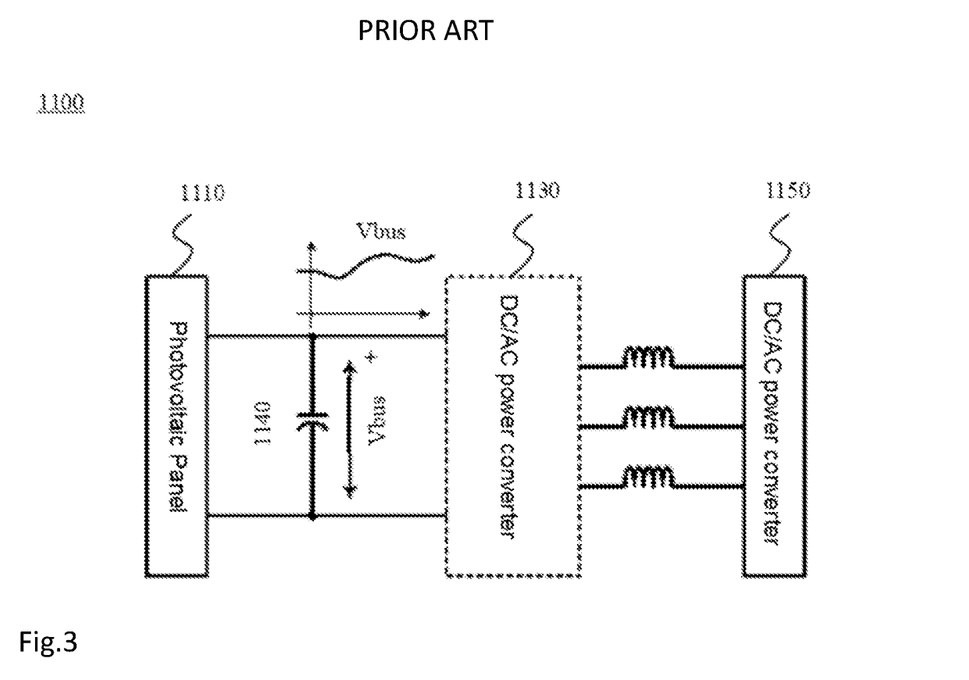
FIG. 3 is a schematic block diagram of a conventional DC/AC power converter with single conversion.

The relation between input voltage Vin, output voltage Vout and duty cycle is shown in FIG. 2, wherein the upper curve shows the output voltage Vout as a function of the input voltage Vin, and the lower curve shows the duty cycle d as a function of the input voltage Vin.

As described above, d=0 for Vin<V1. The input voltage Vin is doubled by the resonant converter 140, and the output voltage Vout is twice the input voltage Vin (Vout=2*Vin). In the specific example shown in FIG. 2, V1=375 V. For an input voltage from 300 V to 375 V, the output voltage therefore increases from 600 V to 750 V.

Between V1 and V2, which in the present case is V2=750 V, the duty cycle d gradually increases and is in the present specific example controlled in a way so that the output voltage Vout is constantly held at Vout=750 V, not depending on Vin. This is achieved by selecting the duty cycle d to:

$$d=2*V\text{in}/V\text{out}-1=V\text{in}/375V-1.$$

In this voltage range, the duty cycle thus linearly increases from 0 at Vin=375 V to 1 at Vin=750 V, while the output voltage Vout is constant.

As soon as the input voltage exceeds V2 (in the specific example: Vin>750 V), the duty cycle d is constantly held at d=1, and the output voltage Vout is equal to the input voltage Vin (Vout=Vin).

In this way, a new topology of a double stage power converter with high efficiency is provided. The DC/DC power converter 100 converts a variable DC input voltage Vin into a higher or equal variable DC output voltage Vout. The voltage range of the output voltage Vout, however, is smaller than the voltage range of the input voltage Vin.

The expected peak efficiency is approximately 99.8% or more. In an experimental set-up with two 7.5 kW converters arranged in parallel, the following results were achieved: At an input voltage Vin of 580 V, the output voltage Vout was 702.8 V, and the total efficiency was 99.73%.

In the case of a voltage doubler, half the output voltage Vout is applied to each of the capacitors 121, 122. Therefore, the switches (e.g. switching transistors) and diodes in the resonant converters may be rated to Vout/2. For example, if the maximum output voltage Vmax=800V, the switches voltage rating is VS>400V. This voltage rating is lower than in a classical boost converter where the switches must be rated to Vout. This is a benefit as low voltage devices are low cost devices with very low on-state resistance and this results in very low conduction losses. The switches are turned on/off when the resonant current is close to zero, having the value necessary to reach the zero voltage switching transitions and avoid high switching losses.

If the input voltage is in the range between V1 and V2, and the boost converter 130 operates with a duty cycle depending on the input voltage Vin, the phase or phases of the boost converter 130 preferably are operated in a boundary mode between a continuous conduction mode and a discontinuous conduction mode of the boost inductor(s) 152a, 152b, including a delay so that the inductor current reverses and produces zero voltage switching transitions for both low side and high side switches.

This converter operates with zero voltage switching transitions under all load conditions. It therefore employs a modulation with a variable frequency to maintain the boundary mode current and zero voltage switching transitions in all the switches. At a higher load, a lower frequency is selected, and vice versa.

If the boost converter is implemented as a multi-phase converter, it is necessary due to this converter control to implement a synchronization between the phases to guarantee a correct current sharing between the phases. Each converter phase must have a current detector which will compare the inductor current with a predefined negative value. The output of this current detector is used as a control signal that turns off the high side transistor 154a, 154b and turns on the low side transistor 155a, 155b. The low side transistor 155a, 155b is turned on during the time set by the voltage feedback loop. In a number of N phases is used, the phases should be delayed for an angle of $2\pi/N$. In order to do so, it is necessary to employ a phase locked loop (PLL) which will use the signals from the current detector to guarantee the correct phase delay between the phases.

For the synchronization of the phases, one phase operates as a master phase, while the remaining phases operate as slave phases which are phase synchronized with the master phase by a phase-locked loop. The master phase controls its on-time thanks to an additional voltage feedback loop and sends the information to the slave phase when it produces transistor switching. The slave phase applies the same on-time as the master phase, but slightly modified in order to delay its switching actions to obtain the desired phase delay of $2\pi/N$.

Even if the above embodiment is described as including a resonant converter, any other type of step-up converters may be used which is able to generate, from an input voltage applied to capacitor, a higher voltage at a series connection of this capacitor with another capacitor by balancing the voltages at the capacitors according to an inverse ratio of their capacitances.

In summary, the present application relates to a double conversion of a voltage from a DC voltage source first into another DC voltage and then into an AC voltage to be consumed by a local load or to be supplied to a power grid. A DC/DC power converter used in the course of this conversion has an input terminal, an output terminal, and a ground terminal. The DC/DC power converter comprises two capacitors connected in series between the output terminal and the ground terminal, a boost converter having a first boost converter terminal connected to the input terminal, a second boost converter terminal connected to the output terminal, and a third boost converter terminal connected to a connection point between the capacitors, and a step-up converter having a first step-up converter terminal connected to the ground terminal, a second step-up converter terminal connected to the output terminal, and a third step-up converter terminal connected to the connection point.

With such a DC/DC power converter it is possible, for example, to convert a variable DC voltage at the input into a variable DC voltage at the output, wherein the voltage range of the output voltage is smaller than the voltage range of the input voltage. Thereby it is possible, for example, to improve the operating conditions of a subsequent DC/AC converter which may result in a larger range of the input voltage for the total power conversion, in an improved overall efficiency of the power conversion as well as in an improved harvesting of energy from a variable voltage source such as a photo-voltaic device or a wind energy device.

The key advantage of the above solution is the fact that the energy that is harvested, for example by a photovoltaic panel, is processed through two paths. This is possible because the proposed hybrid converter is composed of two parts. One part is a voltage doubler based on a step-up converter such as a resonant converter and the other part is a single- or multi-phase boost converter. The role of the resonant converter is to process the major part of the load energy in a very efficient way, while the boost converter processes a partial part of the output power providing the necessary output voltage control.

Among the main advantages of the double-conversion power converter described above, especially if used in the field of photovoltaic electricity generation, are:

Highly efficient DC/DC power converter.

An expected peak efficiency is above 99.8%.

An experimentally obtained efficiency in the nominal point is as high as 99.5%.

Possible power density is higher than 35 kW/dm$^3$.

It is possible to parallelize these converters in order to obtain more power.

A phase shading (temporarily switching off a phase of the boost converter) or converter shading (temporarily switching off the resonant converter) may be applied to achieve a high efficiency at a light load.

While the present invention has been illustrated and described in detail in the drawings and the foregoing description, such illustration and description are to be considered illustrative or exemplary and not restrictive. The invention is not limited to the disclosed embodiment. From reading the present disclosure, other modifications will be apparent to a person skilled in the art. Such modifications may involve other features, which are already known in the art and may be used instead of or in addition to features already described herein.

The invention has been described in conjunction with a specific embodiment herein. However, other variations to the disclosed embodiment can be understood and effected by those skilled in the art in practicing the claimed invention, from a study of the drawings, the disclosure and the appended claims. In the claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

Although the present invention has been described with reference to specific features and an embodiment thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A DC/DC power converter comprising:
    an input terminal;
    an output terminal;
    a ground terminal;
    two capacitors connected in series between the output terminal and the ground terminal;
    a boost converter having a first boost converter terminal connected to the input terminal, a second boost converter terminal connected to the output terminal, and a third boost converter terminal connected to a connection point between the capacitors; and
    a resonant converter having a first step up converter terminal connected to the ground terminal, a second converter terminal connected to the output terminal, and a third converter terminal connected to the connection point, wherein the resonant converter comprises:
        a resonant network for equilibrating a voltage on the capacitors; and
        a resonant capacitor connected between a first and a second internal node.

2. The DC/DC power converter according to claim 1, wherein the resonant converter further comprises:
- a resonance inductor connected between a third internal node and the third converter terminal;
- a first switch connected between the first converter terminal and the first internal node;
- a second switch connected between the first internal node and the third internal node;
- a third switch connected between the third internal node and the second internal node; and
- a fourth switch connected between the second internal node and the second converter terminal.

3. The DC/DC power converter according to claim 2, wherein the resonant converter is configured to operate by alternately toggling between a first state in which the first and third switches are closed and the second and fourth switches are opened, and a second state in which the first and third switches are opened and the second and fourth switches are closed.

4. The DC/DC power converter according to claim 3, wherein the resonant converter is configured to operate in a way that the first to fourth switches are switched with a duty cycle of approximately 50%.

5. The DC/DC power converter according to claim 4, wherein the boost converter is configured to operate depending on an input voltage applied between the input terminal and the ground terminal.

6. The DC/DC power converter according to claim 5, wherein the boost converter comprises a single phase including:
- a boost inductor connected between the first boost converter terminal and a fourth internal node;
- a fifth switch connected between the fourth internal node and the second boost converter terminal; and
- a sixth switch connected between the fourth internal node and the third boost converter terminal.

7. The DC/DC power converter according to claim 2, wherein the first to fourth switches and/or the fifth and sixth switches are formed as semiconductor switches.

8. The DC/DC power converter according to claim 2, wherein the first to fourth switches and/or the fifth and sixth switches are controlled independently.

9. The DC/DC power converter according to claim 1, wherein the boost converter is configured to operate depending on an input voltage applied between the input terminal and the ground terminal.

10. The DC/DC power converter according to claim 1, wherein the boost converter comprises a single phase including:
- a boost inductor connected between the first boost converter terminal and a fourth internal node;
- a fifth switch connected between the fourth internal node and the second boost converter terminal; and
- a sixth switch connected between the fourth internal node and the third boost converter terminal.

11. The DC/DC power converter according to claim 10, being configured to:
- open the fifth switch and close the sixth switch if the input voltage is lower than a first predetermined value (V1);
- close the fifth switch and open the sixth switch if the input voltage is higher than a second predetermined value (V2) which is greater than the first predetermined value (V1); and
- alternately toggle between a third state in which the fifth switch is opened and the sixth switch is closed, and a fourth state in which the fifth switch is closed and the sixth switch is opened, if the input voltage is in a range between the first predetermined value (V1) and the second predetermined value (V2), wherein the duty cycle is selected depending on the input voltage.

12. The DC/DC power converter according to claim 10, being configured to operate the boost converter in a way that the boost inductor operates in boundary mode between a continuous conduction mode and a discontinuous conduction mode.

13. The DC/DC power converter according to claim 1, wherein the boost converter comprises two or more phases, each phase including:
- a boost inductor connected between the first boost converter terminal and a fourth internal node;
- a fifth switch connected between the fourth internal node and the second boost converter terminal; and
- a sixth switch connected between the fourth internal node and the third boost converter terminal.

14. The DC/DC power converter according to claim 13, wherein one of the phases operates as a master phase and the remaining phases operate as slave phases which are phase synchronized with the master phase.

15. The DC/DC power converter according to claim 1, wherein the two capacitors have the same capacitance value so that the resonant converter operates as a voltage doubler.

16. A method of operating a DC/DC power converter, comprising:
- applying an input voltage (Vin) between an input terminal and a ground terminal of the DC/DC power converter; and
- converting the input voltage via a boost converter connected to the input terminal, an output terminal of the DC/DC power converter, and a connection point between two capacitors that are connected in series between the output terminal and the ground terminal, and via a resonant converter connected to the output terminal, the ground terminal, and the connection point, wherein the resonant converter comprises:
  - a resonant network for equilibrating a voltage on the capacitors; and
  - a resonant capacitor connected between a first and a second internal node.

17. A double stage DC/AC power converter comprising:
a DC/DC power converter; and
a DC/AC power converter connected to an output terminal of the DC/DC power converter;
wherein the DC/DC power converter comprises:
two capacitors connected in series between the output terminal and the ground terminal;
a boost converter having a first boost converter terminal connected to the input terminal, a second boost converter terminal connected to the output terminal, and a third boost converter terminal connected to a connection point between the capacitors; and
a resonant converter having a first converter terminal connected to the ground terminal, a second converter terminal connected to the output terminal, and a third converter terminal connected to the connection point, wherein the resonant converter comprises:
- a resonant network for equilibrating a voltage on the capacitors; and
- a resonant capacitor connected between a first and a second internal node.

18. The double stage DC/AC power converter according to claim 17, wherein:
the DC/AC power converter is a single-phase or multiple-phase DC/AC power converter; and/or a DC voltage source having a variable output voltage is connected to an input terminal of the DC/DC power device.

19. The double stage DC/AC power converter according to claim 18, wherein the DC voltage source having a variable output voltage is a device for electricity generation from renewable resources, preferably a photo-photo-voltaic device or a wind energy device.

* * * * *

UNITED STATES PATENT AND TRADEMARK OFFICE
CERTIFICATE OF CORRECTION

PATENT NO. : 11,011,990 B2  
APPLICATION NO. : 16/935812  
DATED : May 18, 2021  
INVENTOR(S) : Petar Grbovic et al.

Page 1 of 1

It is certified that error appears in the above-identified patent and that said Letters Patent is hereby corrected as shown below:

In the Claims

Claim 1, Column 14, Line 58, delete "a resonant converter having a first step up converter" and insert --a resonant converter having a first converter--.

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*